United States Patent
Huang et al.

(10) Patent No.: US 10,752,314 B2
(45) Date of Patent: Aug. 25, 2020

(54) CONVERTIBLE CHILD CYCLE

(71) Applicant: Mark Lin, Taipei (TW)

(72) Inventors: Hsin-Fu Huang, Yunlin County (TW); Shih-Ying Chang, Yunlin County (TW); Sih-Wei Huang, Yunlin County (TW); Zhao-Bo Zhan, Yunlin County (TW)

(73) Assignee: Mark Lin, Taipei (TW)

( * ) Notice: Subject to any disclaimer, the term of this patent is extended or adjusted under 35 U.S.C. 154(b) by 215 days.

(21) Appl. No.: 16/113,084

(22) Filed: Aug. 27, 2018

(65) Prior Publication Data
US 2019/0217914 A1    Jul. 18, 2019

(30) Foreign Application Priority Data

Jan. 15, 2018 (TW) .............................. 107101437 A

(51) Int. Cl.
*B62K 15/00* (2006.01)
*B62K 9/00* (2006.01)
(Continued)

(52) U.S. Cl.
CPC ................ *B62K 15/00* (2013.01); *B62K 5/06* (2013.01); *B62K 9/00* (2013.01); *B62K 9/02* (2013.01);
(Continued)

(58) Field of Classification Search
CPC .... B62K 2015/001; B62K 15/00; B62K 9/00; B62K 9/02
See application file for complete search history.

(56) References Cited

U.S. PATENT DOCUMENTS

| 3,658,354 A | 4/1972 | Read |
| 5,556,116 A | 9/1996 | Sloss et al. |

(Continued)

FOREIGN PATENT DOCUMENTS

| CN | 204507112 | 7/2015 |
| CN | 206187232 | 6/2017 |

(Continued)

OTHER PUBLICATIONS

Taiwan Search Report for Application No. 107101437.

*Primary Examiner* — Kevin Hurley
(74) *Attorney, Agent, or Firm* — Jackson IPG PLLC; Demian K. Jackson

(57) ABSTRACT

The present invention relates to a convertible child cycle, which includes a cycle frame extending in a horizontal longitudinal direction and curved upwardly. The cycle frame is formed with a slot facing downward. The cycle frame is further formed with a first installation connector adjacent to the front end, a second installation connector adjacent to the rear end, and a third installation connector disposed between the first and second installation connectors. The child cycle further includes a headset assembly and a rear fork assembly releasably engaged the first and the second installation connectors, respectively. With the growth of a preschool child rider, the invention may be readily converted into a tricycle, a balance bicycle or a bicycle by combining the cycle frame with various accessory parts, thereby satisfying the recreation needs of the preschool child at different developmental stages.

10 Claims, 13 Drawing Sheets

(51) Int. Cl.
*B62K 19/18* (2006.01)
*B62K 9/02* (2006.01)
*B62K 5/06* (2006.01)
*B62K 13/04* (2006.01)

(52) U.S. Cl.
CPC .............. *B62K 13/04* (2013.01); *B62K 19/18* (2013.01); *B62K 2015/001* (2013.01)

(56) References Cited

U.S. PATENT DOCUMENTS 6,164,666 A     12/2000   Prea
9,387,903 B2 *   7/2016   O'Connell ............. B62K 19/18

FOREIGN PATENT DOCUMENTS

| CN | 208993848 U | * | 6/2019 | ............. B62K 15/00 |
| FR | 2987813 A1 | * | 9/2013 | ............. B62K 15/00 |
| TW | 377695 | | 12/1991 | |

* cited by examiner

CONVERTIBLE CHILD CYCLE

CROSS REFERENCE TO RELATED APPLICATION

This application claims priority to R.O.C. Patent Application No. 107101437 filed Jan. 15, 2018, which is hereby incorporated by reference in its entirety.

FIELD OF THE INVENTION

The present invention generally relates to a riding appliance for preschool children, and more particularly to a convertible child cycle that can be easily assembled.

DESCRIPTION OF RELATED ART

In the course of children's growth, there are different learning and developmental priorities at different stages. For example, a baby about 6-month old begins to learn turning over. One-year-old children begin to learn walking, and children two to three-year old begin to try running and jumping. Therefore, relevant industry develops different products for children's learning and development priorities at different stages to assist them in learning.

The growth stage, especially from zero to six year old, is a critical period of rapid change in body size and behavior. In face with children's different stages of growth, there are various kinds of products such as baby carriages, baby strollers, rocking horses, walkers, walking walkers, balance bicycles and child tricycles. Since these products are designed for performing a single function to meet children's needs at a specific developmental stage, they will soon be thrown aside and take up much space as children grow up.

Efforts have been made to develop convertible child cycles. For instance, U.S. Pat. No. 6,164,666 discloses a multi-functional child cycle with a U-shaped frame that can be selectively converted into a child bicycle or a child tricycle. However, there is no detachable contact between the U-shaped frame and the headset assembly and rear fork assembly. U.S. Pat. No. 3,658,354 discloses a multi-functional child cycle that can be converted into a child bicycle or a child tricycle, but there is no detachable contact between the U-shaped frame and the headset assembly. U.S. Pat. No. 5,556,116 also discloses a child cycle frame that can be converted into a child bicycle or a child tricycle, but there is no detachable contact between the cycle frame and the seat tube.

SUMMARY OF THE INVENTION

In one aspect provided herein is a convertible child cycle, whose basic elements can be readily assembled in different ways to form cycles with various configurations and functions, thereby fitting children's needs at different developmental stages. In particular, the invention can be converted into a child tricycle, a balance bicycle and a child bicycle to satisfy the walking and recreational needs of the preschoolers at different developmental stages.

The convertible child cycle disclosed herein comprises:

a cycle frame comprising an arc-shaped tubular body having a front end opening and a rear end opening and extending in a horizontal longitudinal direction and curved upwardly to define a hollow interior, wherein the arc-shaped tubular body is formed with a slot facing downward and extending from the front end opening to the rear end opening in the horizontal longitudinal direction, and the slot is substantially narrower in width than the hollow interior in a traverse direction substantially perpendicular to the horizontal longitudinal direction, and wherein the arc-shaped tubular body is further formed with a first installation connector disposed adjacent to the front end opening, a second installation connector disposed adjacent to the rear end opening, and a third installation connector disposed between the first and second installation connectors;

a headset assembly removably connected to the arc-shaped tubular body by releasable engagement with the first installation connector, the front end opening and the hollow interior; and a rear fork assembly removably connected to the arc-shaped tubular body by releasable engagement with the second installation connector, the rear end opening and the hollow interior.

In a preferred embodiment, the arc-shaped tubular body comprises an elongated plate body that extends and curves upward along the horizontal longitudinal direction. The elongated plate body comprises two opposite side walls that are bent downwardly along its full length and two retaining walls that are extended toward each other from the side walls. The retaining walls are spaced apart by a substantially constant distance, thereby defining the hollow interior and the slot.

In a more preferred embodiment, the third installation connector is away from the second installation connector by a distance substantially shorter than that between the third installation connector and the first installation connector.

In a more preferred embodiment, the third installation connector is located at a position approximately one-fourth the arc-shaped tubular body's full length from the rear end opening.

In one preferred embodiment, the first, the second, and the third installation connectors are configured as a first, a second, and a third openings disposed on the arc-shaped tubular body, and the first, the second, and the third openings are arranged along the horizontal longitudinal direction and disposed opposite to the slot.

In an alternative preferred embodiment, at least one of the first, the second, and the third installation connectors is configured to be a fastener secured to the arc-shaped tubular body.

In a preferred embodiment, the invention further comprises a first, a second and a third adapters for a releasable engagement with the first, the second, and the third installation connectors, respectively, wherein each of the first, the second and the third adapters comprises a coupling unit for releasable engagement with the hollow interior, a connecting unit, and a clasping unit for releasable engagement with one of the first, the second, and the third installation connectors.

In a preferred embodiment, the invention is converted into a child tricycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting units of the second and the third adapters and pivotally provided with two rear wheels. The convertible child cycle further comprises a seat releasably engaged the cycle frame adjacent to the third adapter, and a hand pusher unit removably connected to the cycle frame by releasable engagement with the connecting unit of the second adapter.

In another preferred embodiment, the invention is converted into a balance cycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting units of the second and the third adapters and pivotally provided with a single rear wheel. The convertible child cycle further comprises a seat removably connected to the cycle frame by releasable engagement with the connecting unit of the second adapter.

In still another preferred embodiment, the invention is converted into a child bicycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting unit of the second adapter and pivotally provided with a single rear wheel. The convertible child cycle further comprises a seat removably connected to the cycle frame by releasable engagement with the connecting unit of the second adapter, and a pedal drive unit removably connected to the cycle frame by releasable engagement with the connecting unit of the third adapter.

DETAILED DESCRIPTION OF THE INVENTION

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/ comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
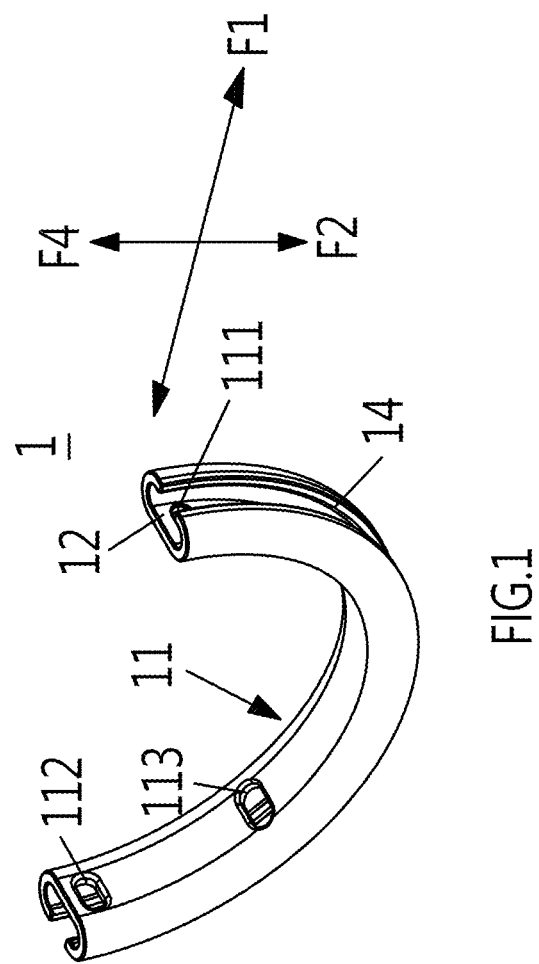
FIG. 1 shows a perspective view of the cycle frame according to the invention.
Figure 2:
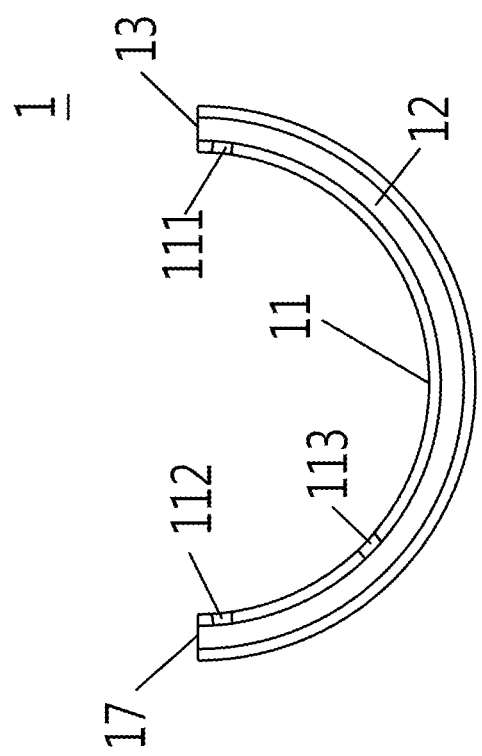
FIG. 2 shows a side cross-sectional view of the cycle frame according to the invention.
Figure 3:
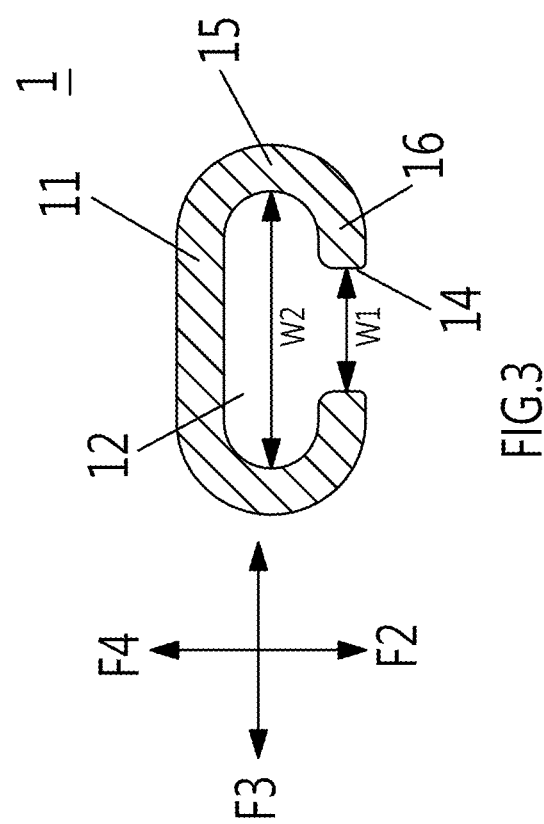
FIG. 3 shows another cross-sectional view of the cycle frame according to the invention.

As shown in FIG.1, a cycle frame 1 comprises generally an arc-shaped tubular body 11, preferably in the form of a hollow tube, extending in a horizontal longitudinal direction F1 and curved in an upward direction F4. The arc-shaped tubular body 11 has a hollow interior 12 and formed at its two ends with a front end opening 13 and a rear end opening 17, respectively, both communicating with the hollow interior 12. The arc-shaped tubular body 11 is further formed with a slot 14 facing toward a downward direction F2 and communicating with the hollow interior 12. The slot 14 extends from the front end opening 13 to the rear end opening 17 along the horizontal longitudinal direction F1. Referring to FIGS. 2 and 3, the slot 14 has a width W1 in the traverse direction F3 substantially perpendicular to the horizontal longitudinal direction F1, and the width W1 is substantially smaller than the width W2 of the hollow interior 12 in the traverse direction F3. The arc-shaped tubular body 11 is further formed with a first installation connector 111 disposed adjacent to the front end opening 13, a second installation connector 112 disposed adjacent to the rear end opening 17, and a third installation connector 113 disposed between the first and second installation connectors 111, 112, for mounting the headset assembly, the rear fork assembly and the seat. In a preferred embodiment, the third installation connector 113 is located near the middle of the arc-shaped tubular body 11. Desirably, the distance between the third installation connector 113 and the second installation connector 112 is substantially shorter than that between the third installation connector 113 and the first installation connector 111. For instance, the third installation connector 113 is located at approximately one-fourth of the full length of the arc-shaped tubular body 11 from the rear end opening 17. In a preferred embodiment, the first, the second, and the third installation connectors 111, 112, 113 are configured to be a first, a second, and a third openings 111, 112, 113 disposed on the arc-shaped tubular body 11. Preferably, the first, the second, and the third openings 111, 112, 113 are arranged along the horizontal longitudinal direction F1 and, more preferably, the first, the second, and the third openings 111, 112, 113 are arranged opposite to the slot 14, respectively. In an alternative preferred embodiment, at least one of the first, the second, and the third installation connectors 111, 112, 113 is configured to be a fastener secured to the arc-shaped tubular body 11, such as a bolt (not shown). Although the arc-shaped tubular body 11 is depicted in FIG. 3 to have a generally C-shaped cross-section, it may have any cross-sectional configuration known in the art.

As shown in FIG. 3, the arc-shaped tubular body 11 includes an elongated plate body that extends along the horizontal longitudinal direction F1 and is upwardly curved. The plate body is bent on both sides towards the downward direction F2 along its full length, so as to constitute two opposite side walls 15 which define the hollow interior 12. The two side walls 15 are further extended toward each other to constitute two retaining walls 16. The two retaining walls 16 are spaced apart from each other by a substantially constant distance W1 to define the slot 14.

The cycle frame 1 serves as the main part of the child cycle. By virtue of the hollow interior 12, the front end opening 13, the rear end opening 17, and the first, the second and the third installation connectors 111, 112, 113, the cycle frame 1 is adapted for releasable engagement with other components of the child cycle, so that the child cycle can be changed in configuration and riding mode. The term "releasable engagement" as used herein may refer to direct or indirect coupling operation between two elements that can be undone by reversing the motion or the action that caused the coupling to happen, and this can be repeated time and again without essentially causing damage to the elements. As described below, the first installation connector 111, the hollow interior 12 and the front end opening 13 together constitute a connector structure that can be brought into releasable engagement with the headset assembly 3, whereas the second installation connector 112, the hollow interior 12 and the rear end opening 17 together form another connector structure that can be brought into releasable engagement with the rear fork assembly 4. These connector structures can not only be assembled with or dissembled from their corresponding parts through simple processes, but also enables the cycle frame 1 to achieve a stable connection with the headset assembly 3 and the rear fork assembly 4, thereby making the assembled child cycle robust and safe.

Figure 4A:
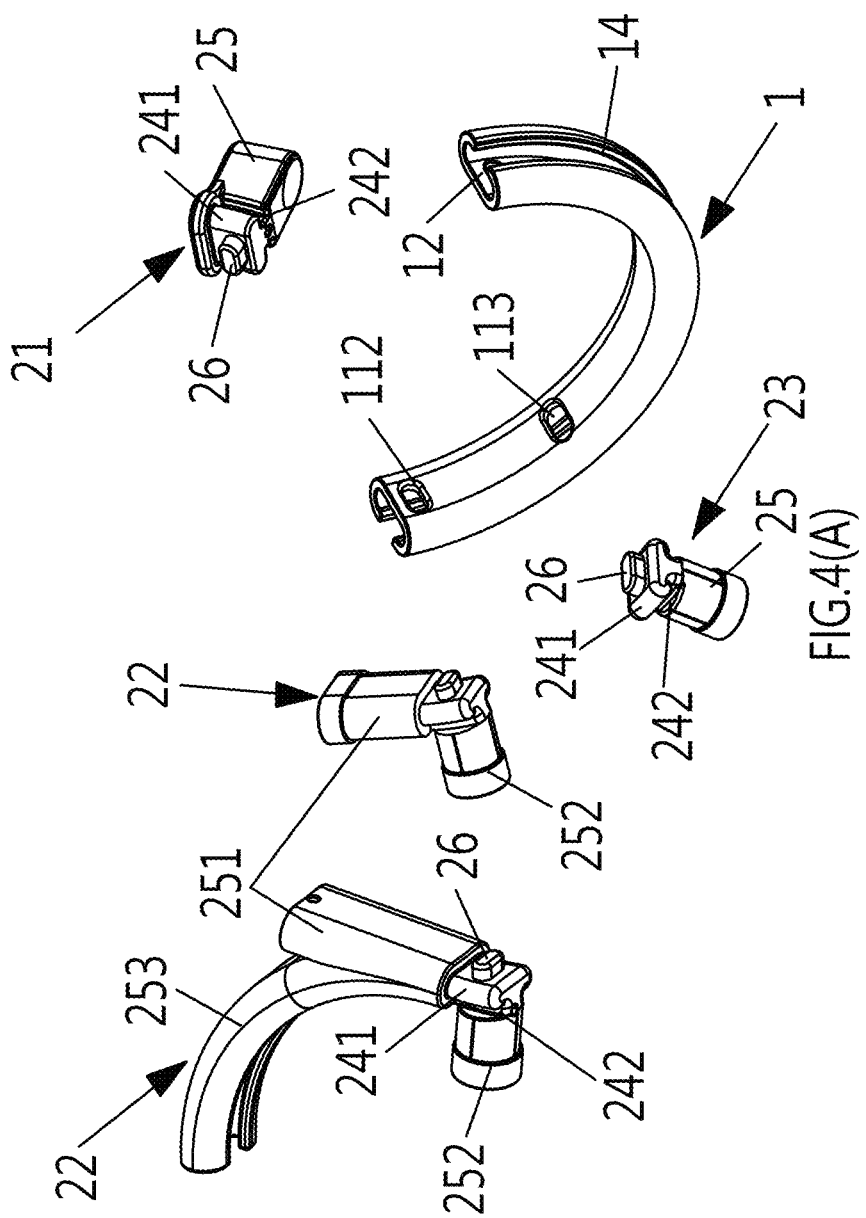
FIGS. 4(A) and (B) show perspective views of basic components of the convertible child cycle according to the invention.
Figure 4B:
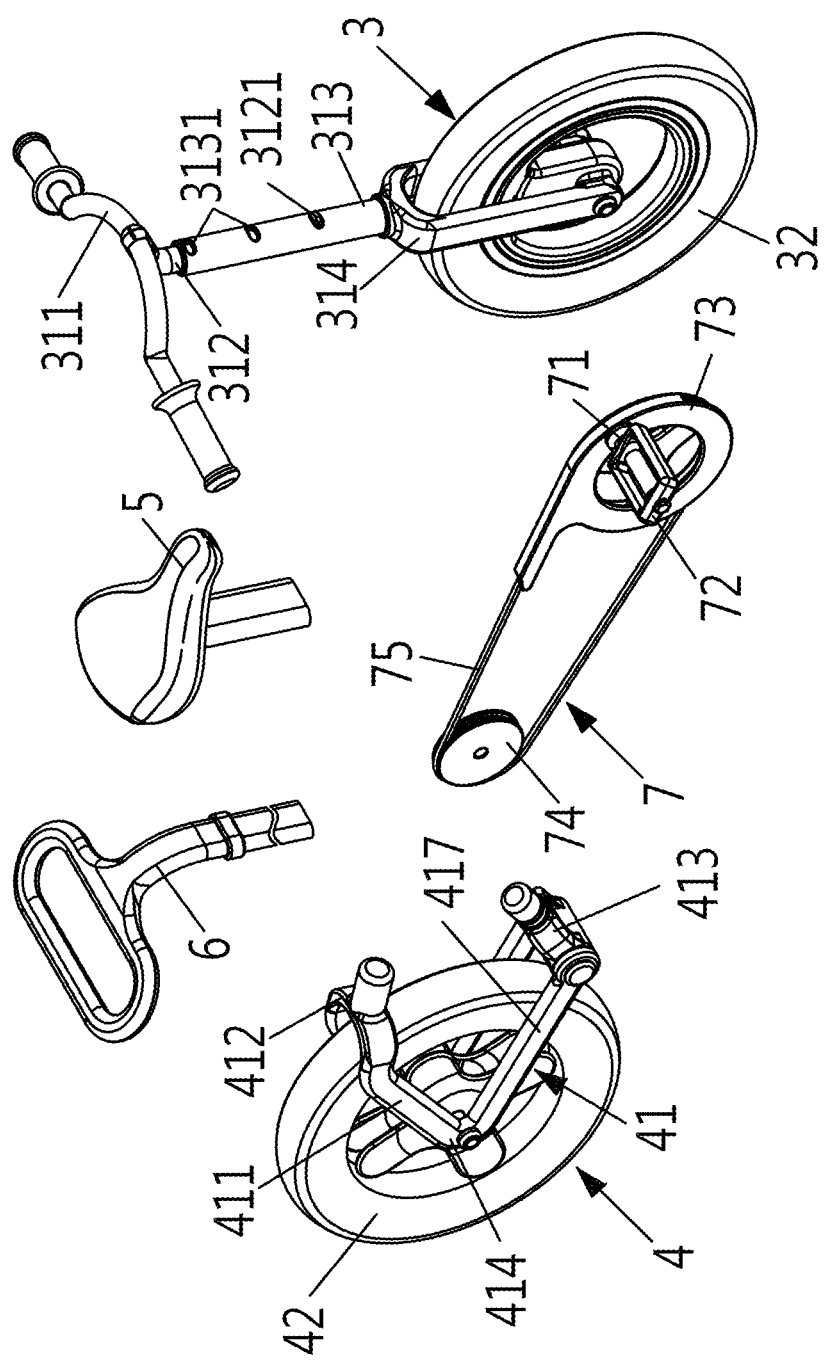
Figure 5:
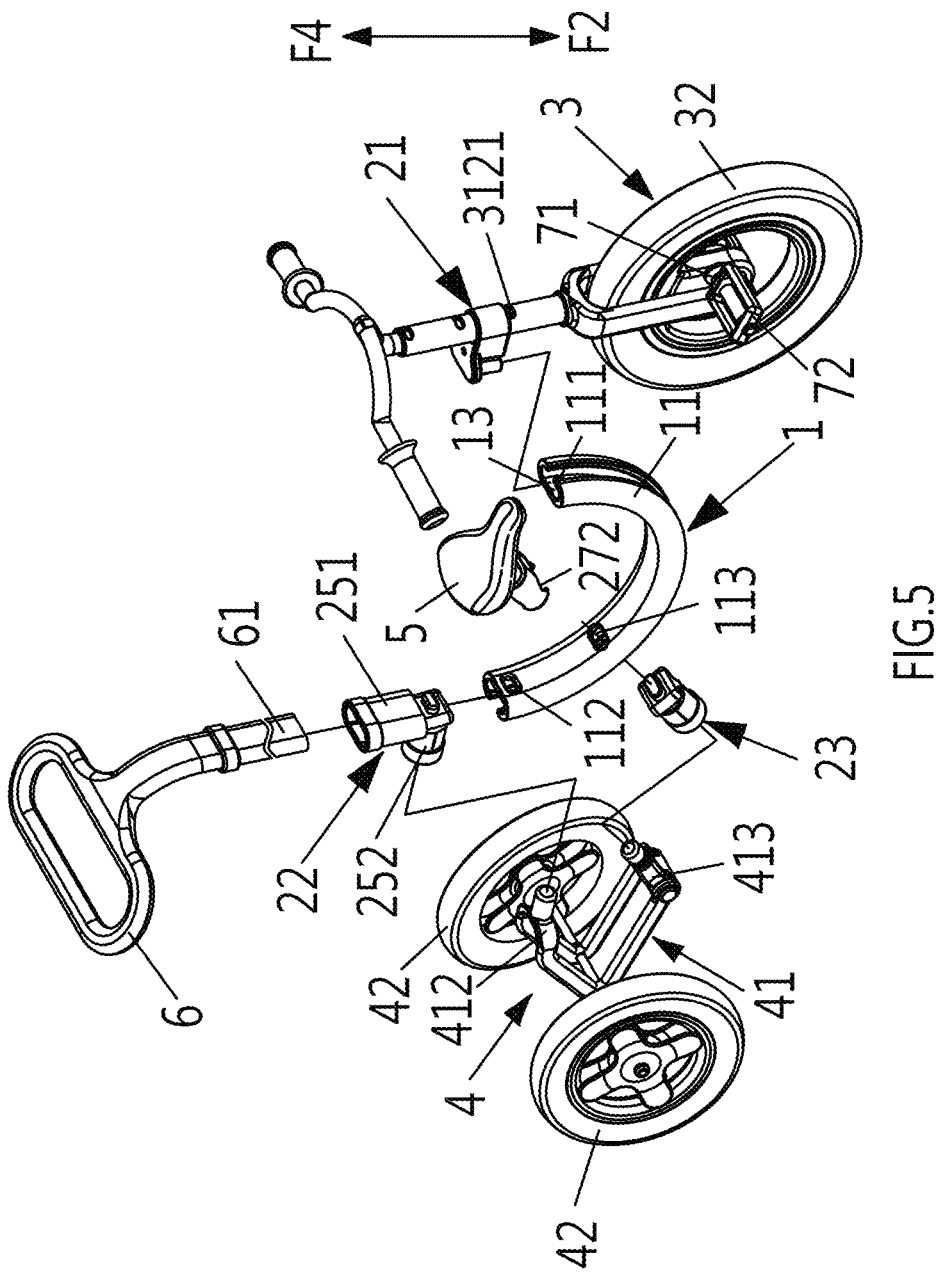
FIG. 5 shows an exploded view of the first embodiment according to the invention.

In a preferred embodiment, the convertible child cycle further comprises a first, a second and a third adapters 21, 22, 23 adapted to establish a releasable engagement with the first, the second, and the third installation connectors 111, 112, 113. The first, the second and the third adapters 21, 22, 23 allow the arc-shaped tubular body 11 to be adapted to the other parts of the child cycle, thereby enabling the conversion of the child cycle from one configuration to another. Referring to the perspective views of the child cycle shown in FIGS. 4(A) and (B), in the preferred embodiment where the first, the second and the third installation connectors 111, 112, 113 are configured as the first, the second and the third openings 111, 112, 113 on the arc-shaped tubular body 11, the invention may comprise, in addition to the cycle frame 1, the first adapter 21, the second adapter 22 and the third adapter 23 described above, a headset assembly 3, a rear fork assembly 4, a seat 5, a hand pusher unit 6, and a pedal drive unit 7. The first, the second and the third adapters 21, 22, 23 each has a coupling unit for engagement with the hollow interior 12, a connecting unit 25 for engagement with other parts of the convertible child cycle, and a clasping unit 26 for releasable engagement with one of the first, the second, and the third openings 111, 112, 113. The coupling unit includes an engaging portion 241 corresponding to the hollow interior 12, and a neck portion 242 adjacent to the engaging portion 241 and corresponding to the slot 14. The engaging portion 241 is configured to conform in shape to the hollow interior 12, whereas the neck portion 242 is configured to conform in shape to the slot 14, so that the engaging portion 241 can enter the hollow interior 12 via either the front end opening 13 or the rear end opening 17, allowing the engaging portion 241 to slide within and abut against the hollow interior 12 and allowing the neck portion 242 to abuts against the slot 14. The connecting unit 25 is adjacent to the neck portion 242 for receiving other parts of the child cycle. Preferably, the connecting unit 25 is configured in the form of a socket for receiving the complementary plug portion provided on other parts. According to this embodiment, the clasping portion 26 is configured as a biasing element, such as a spring-loaded pin, protruding from the engaging portion 241 and biased outwardly. Preferably, the clasping portion 26 is configured to be complementary in shape to the first, the second, and the third openings 111, 112, 113, so that it is suitable for releasable engagement with the first, the second, and the third openings 111, 112, 113.

In a preferred embodiment, the second adapter 22 may have two alternative configurations. One configuration is that the connecting unit 25 of the second adapter 22 has two connecting portions, i.e., the first and the second connecting portions 251, 252. The other is that the connecting unit 25 of the second adapter 22 includes three connecting portions, i.e., the first, the second and the third connecting portions 251, 252, 253. The two alternative configurations allow the second assembly 22 to have more options when connecting parts.

The headset assembly 3 comprises a handle set and a front wheel 32 controlled by the handle set. The handle set includes handlebars 311, a stem 312 connecting to the handlebar 311, an outer tube 313 in which the stem 312 is sleeved, and a front fork 314 connecting to the outer tube 313. The front wheel 32 is pivotally supported on the front fork 314. Preferably, the outer tube 313 is formed with a plurality of holes 3131 arranged in a vertical row, while the stem 312 is formed with a protrusion 3121 adapted for insertion into the respective holes 3131, so that the height of handlebar 311 can be adjusted manually by changing the relative depth of the stem 312 in the outer tube 313.

The rear fork assembly 4 includes a connecting frame 41 and at least one rear wheel 42 pivotally connected to the connecting frame 41. In a preferred embodiment, the connecting frame 41 is composed of an upper rear fork 411 and a lower rear fork 417, wherein the upper rear fork 411 converges into a protrusion 412 and the lower rear fork 417 converges into a protrusion 413. The upper rear fork 411 and the lower rear fork 417 are connected at a position 414 where the at least one rear wheel 42 is mounted pivotally.

The seat 5 may be configured in any suitable configuration that is convenient for the child to ride on, and it is adapted for releasable engagement with either the second or the third adapter 22, 23.

The pedal drive unit 7 includes a cycle transmission system which may be driven by the pedals to rotate the wheel. The basic function of the cycle transmission system is to transmit a mechanical force, generated as a result of the rider's alternate pedaling of the pedals which drives turning of the cranks, to a chain wheel and further to a free wheel through a linkage member. The free wheel then drives the wheel to move forward. In a preferred embodiment, the pedal drive unit 7 includes a crank 71, two pedals 72, and a transmission assembly. The pedals 72 are pivotally connected to the crank 71, respectively. The transmission assembly has a chain wheel 73 linked with the crank 71, a free wheel 74 linked with the rear wheel 42, and a linkage member 75 which connects the chain wheel 73 to the free wheel 74.

FIG. 5 to FIG. 8 show the first embodiment according to the invention, in which the cycle frame 1 is assembled with additional parts to form a child tricycle comprising the cycle frame 1, a first adapter 21, a second adapter 22 and a third adapter 23, a headset assembly 3, a rear fork assembly 4, a seat 5 and a hand pusher unit 6. Preferably, the child tricycle is assembled following the steps described below.

Step S101: a step for removably connecting the headset assembly 3 to the cycle frame 1. The engaging portion 241 of the first adapter 21 is slid into the hollow interior 12 through the front end opening 13, while the neck portion 242 abuts against the slot 14. Then the clasping part 26 is made to fit into the first opening 111, so that the first opening 111, the hollow interior 12 and the front end opening 13 work together to secure the first assembly 21 in position. When disassembling, the clasping part 26 may be pressed to disengage it from the first opening 111, and then the engaging portion 241 of the first adapter 21 is made to detach from the front end opening 13. The connecting unit 25 of the first adapter 21 may be configured in the form of a hollow tube, through which the outer tube 313 of the headset assembly 3 may be sleeved, thereby fixing the headset assembly 3 in position. In this embodiment, the front wheel 32 is further connected with a crank 71, and two pedals 72 are pivotally connected to the crank 71, respectively. The two pedals 72 can be pedaled alternately to drive the front wheel 32 to move forward.

Step S102: a step for removably connecting the rear fork assembly 4 to the cycle frame 1. The engaging portion 241 of the second adapter 22 is slid into the hollow interior 12 through the rear end opening 17, while the neck portion 242 abuts against the slot 14. Then the clasping part 26 is made to fit into the second opening 112, so that the second opening 112, the hollow interior 12 and the rear end opening 17 work together to secure the second adapter 22 in position. When disassembling, the clasping part 26 may be pressed to disengage it from the second opening 112, and then the engaging portion 241 of the second adapter 22 is made to detach from the rear end opening 17. In a similar manner, the third adapter 23 is mounted to the third opening 113, so that the third adapter 23 is secured by the third opening 113 and the hollow interior 12. Subsequently, the protrusions 412, 413 of the rear fork assembly 4 are releasably engaged with the second, and the third adapters 22, 23, respectively. In this embodiment, the rear fork assembly 4 includes two rear wheels 42 pivotally connected to the connecting frame 41.

The connecting units 25 of the second and the third adapters 22, 23 and the child cycle parts to be received by the connecting units 25 can be in any releasable engagement relationship known in the art, such as a snap-in or screw connection relationship, as long as it can achieve a firm releasable engagement. In the embodiments shown in FIGS. 5-8, the connecting unit of the second adapter 22 includes the first and the second connecting portions 251, 252 configured in the form of a socket. The first connecting portion 251 is adapted to receive and therefore secure a tube body 61 of the hand pusher unit 6, so that the hand pusher unit 6 is erected above the cycle frame 1 by the first connecting portion 251. The second connecting portion 252 is adapted for receiving the protrusion 412 of the connecting frame 41.

Figure 6:
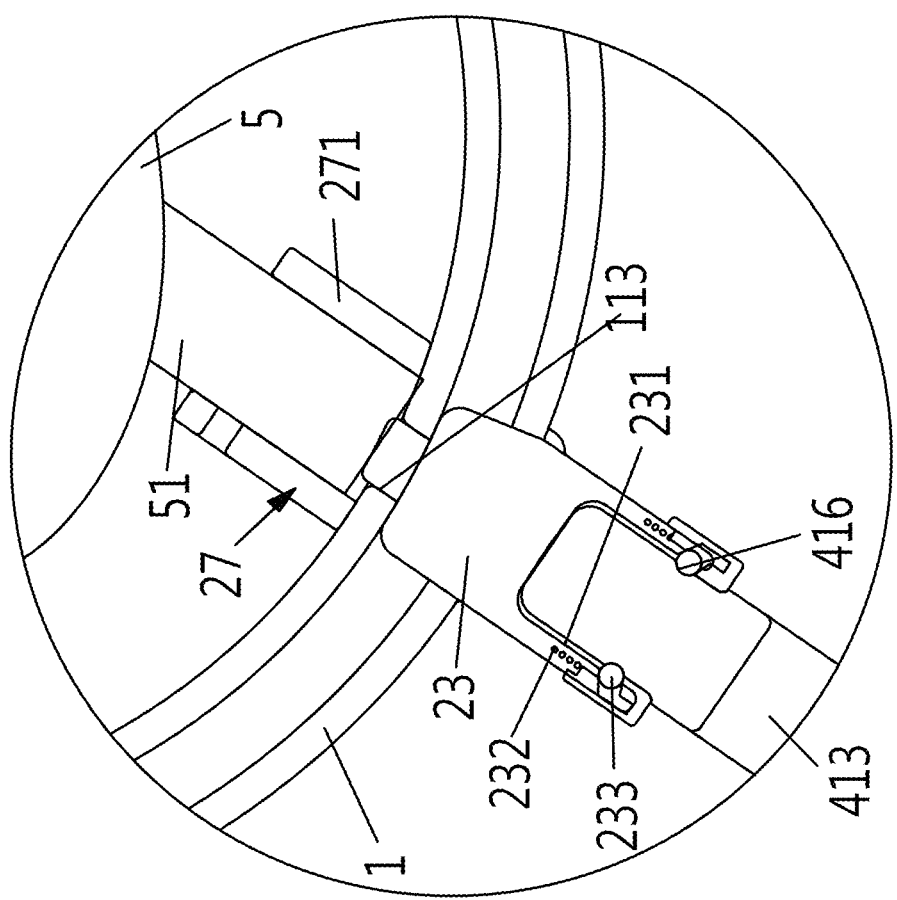
FIG. 6 shows a side cross-sectional view of the first embodiment according to the invention.
Figure 7:
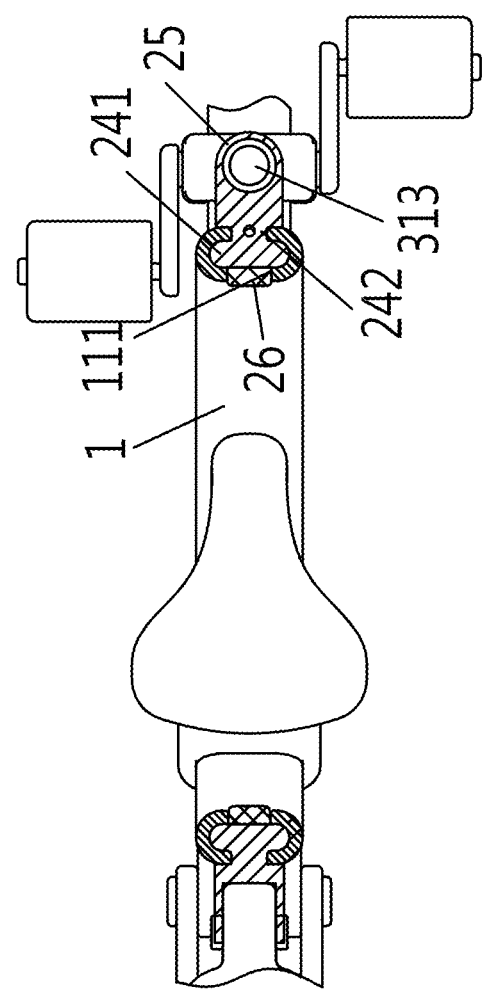
FIG. 7 shows another cross-sectional view of the first embodiment according to the invention.

In a preferred embodiment, the second connecting portion 252 of the second adapter 22 and the protrusion 412 of the connecting frame 41, as well as the third connecting portion 253 of the third adapter 23 and the protrusion 413 of the connecting frame 41, are in a snap-in connection relationship which involves two complementary snap-in elements adapted to releasably engage each another. For example, as shown in FIG. 6, the connecting unit 25 of the third adapter 23 includes a socket 231, an elastic member 232 (e.g., a spring), and a plurality of clamping members 233 annularly disposed on the inner wall of the socket 231 (e.g., steel balls). The protrusion 413 is radially formed with a groove 416. The clamping member 233 is forced by the elastic member 232 to bias toward the inside of the socket 231, so that when the protrusion 413 is inserted into the socket 231, the clamping member 233 abuts against the groove 416 to achieve the snap-in connection.

Step S103: a step for removably connecting the seat 5 to the cycle frame 1. The seat 5 is removably connected to the cycle frame 1 adjacent to the third opening 113. In a preferred embodiment, a fourth adapter 27 is further used to secure the seat 5 at a position adjacent to the third opening 113. The fourth adapter includes a first connecting portion 271 and a clamping member 272 conforming in shape to the cycle frame 1. The first connecting portion 271 is configured in the form of a socket for receiving and therefore fixing the tube body 51 of the seat 5, and the clamping member 272 is adapted to removably secure the seat 5 in position.

Figure 8:
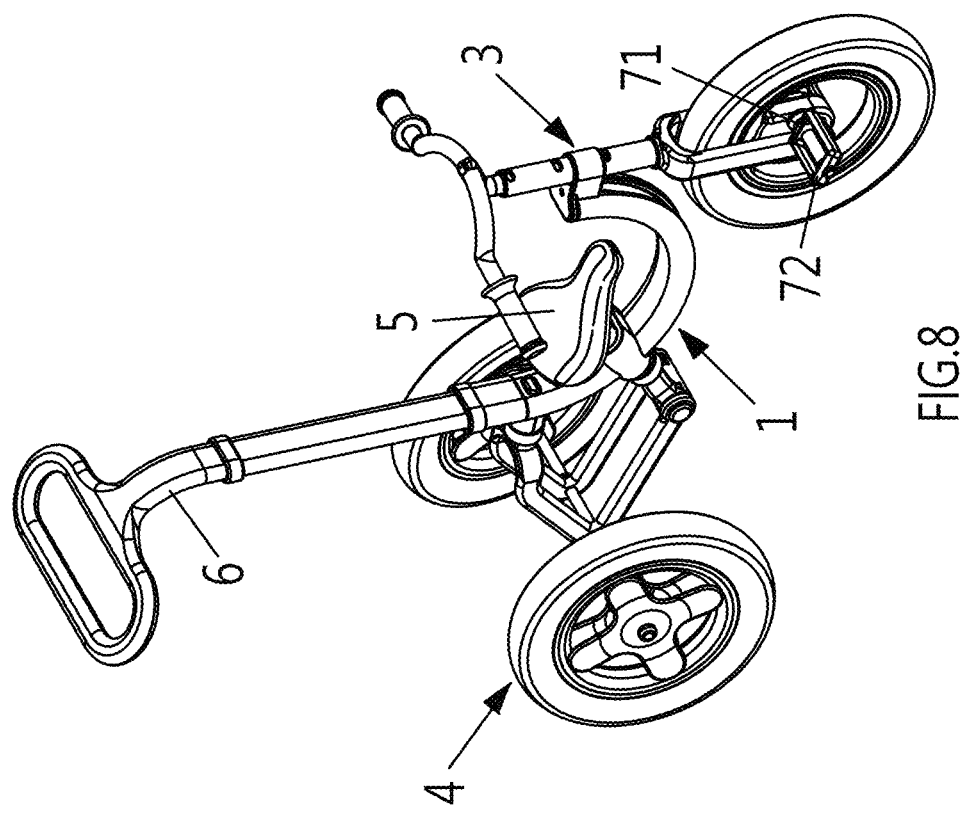
FIG. 8 shows a perspective view of the first embodiment according to the invention.

FIG. 8 shows the assembled child tricycle. It is adapted for being ridden by a 2-3 year old child to train his/her pedaling ability and enhance has/her leg muscle endurance. In addition to providing a child to ride on the seat 5 and pedal the pedals 72 with feet for driving forward, the child tricycle allows a caregiver to push or pull the hand pusher unit 6 to move forward.

Figure 9:
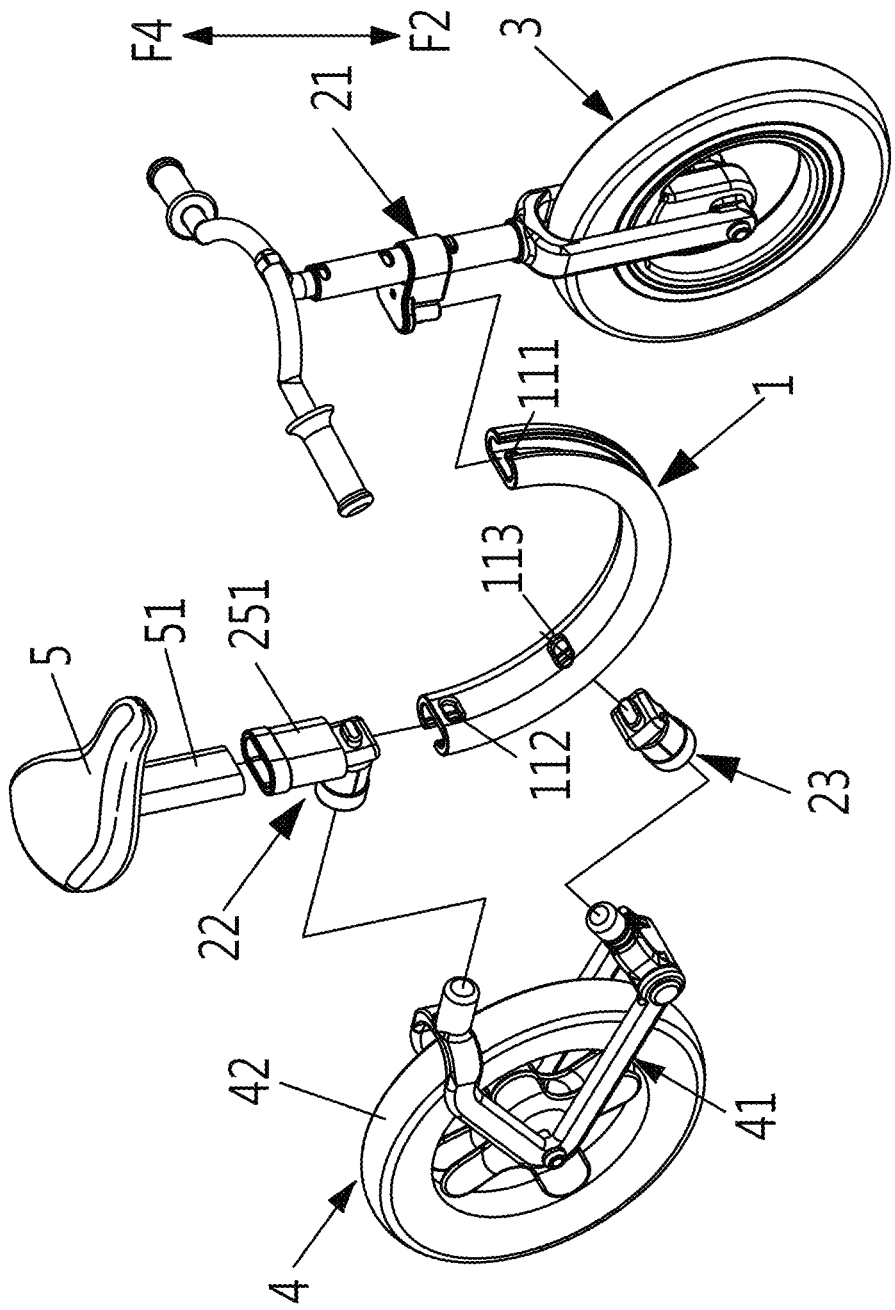
FIG. 9 shows an exploded view of the second embodiment according to the invention.
Figure 10:
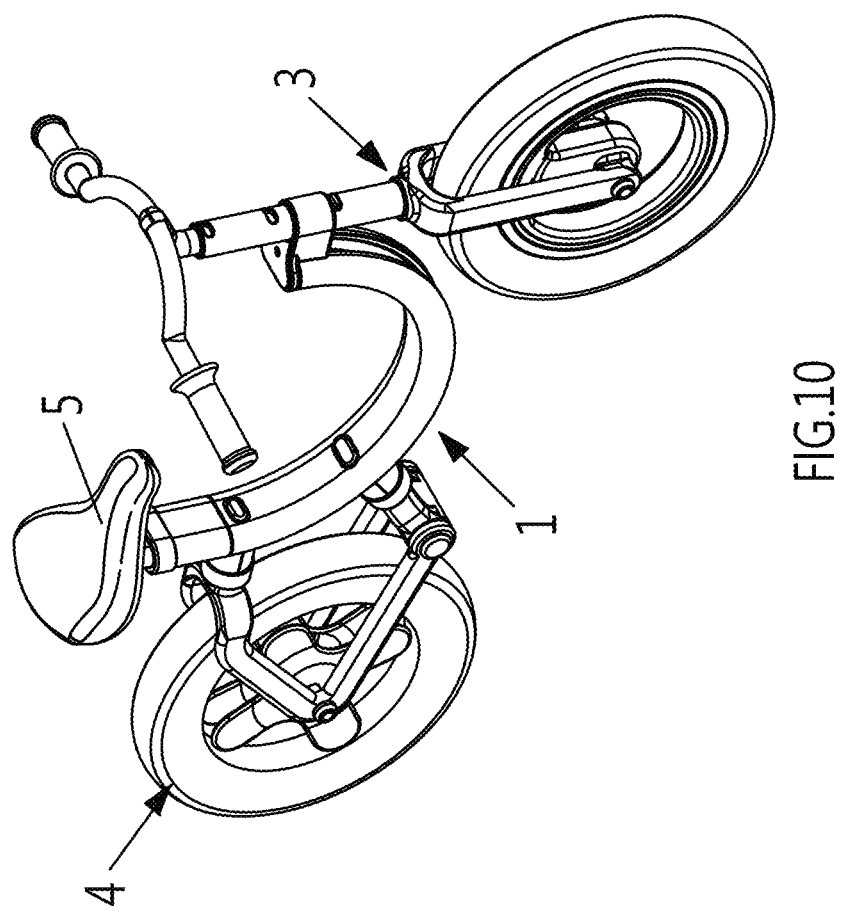
FIG. 10 shows a perspective view of the second embodiment according to the invention.

FIG. 9 and FIG. 10 show the second embodiment according to the invention, in which the cycle frame 1 is assembled with additional parts to form a balance cycle comprising the cycle frame 1, a first adapter 21, a second adapter 22 and a third adapter 23, a headset assembly 3, a rear fork assembly 4 and a seat 5. Preferably, the balance cycle is assembled following the steps described below.

Step S201: a step for removably connecting the headset assembly 3 to the cycle frame 1. The first adapter 21 is releasably engaged the first opening 111 to position the headset assembly 3. Step S201 is substantially the same as step S101 described in the first embodiment, except that the front wheel in the second embodiment is not assembled with a crank and pedals.

Step S202: a step for removably connecting the rear fork assembly 4 to the cycle frame 1. Step S202 is substantially the same as step S102 described in the first embodiment, except that the first connecting portion 251 of the second adapter 22 is not assembled with a hand pusher unit, and that the rear fork assembly 4 includes only a single rear wheel pivotally connected to the connecting frame 41.

Step S203: a step for removably connecting the seat 5 to the cycle frame 1. The tube body 51 at the bottom of the seat 5 is removably connected to the first connecting portion 251 of the second adapter 22.

FIG. 10 shows the assembled balance cycle. It is suitable for a 3-4 year old child to ride on and move forward by two feet, as a means to train the child's balance.

Figure 11:
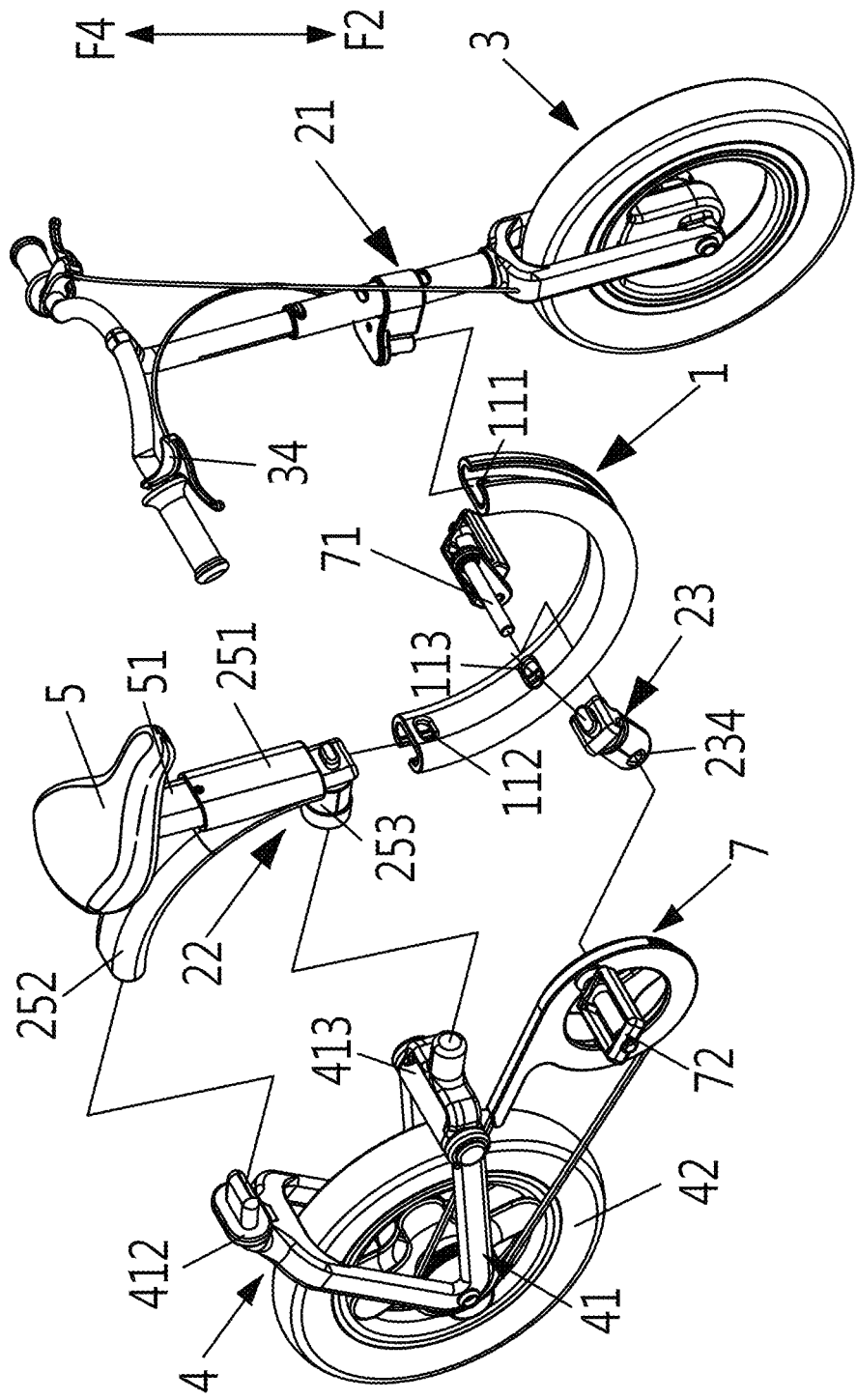
FIG. 11 shows an exploded view of the third embodiment according to the invention.
Figure 12:
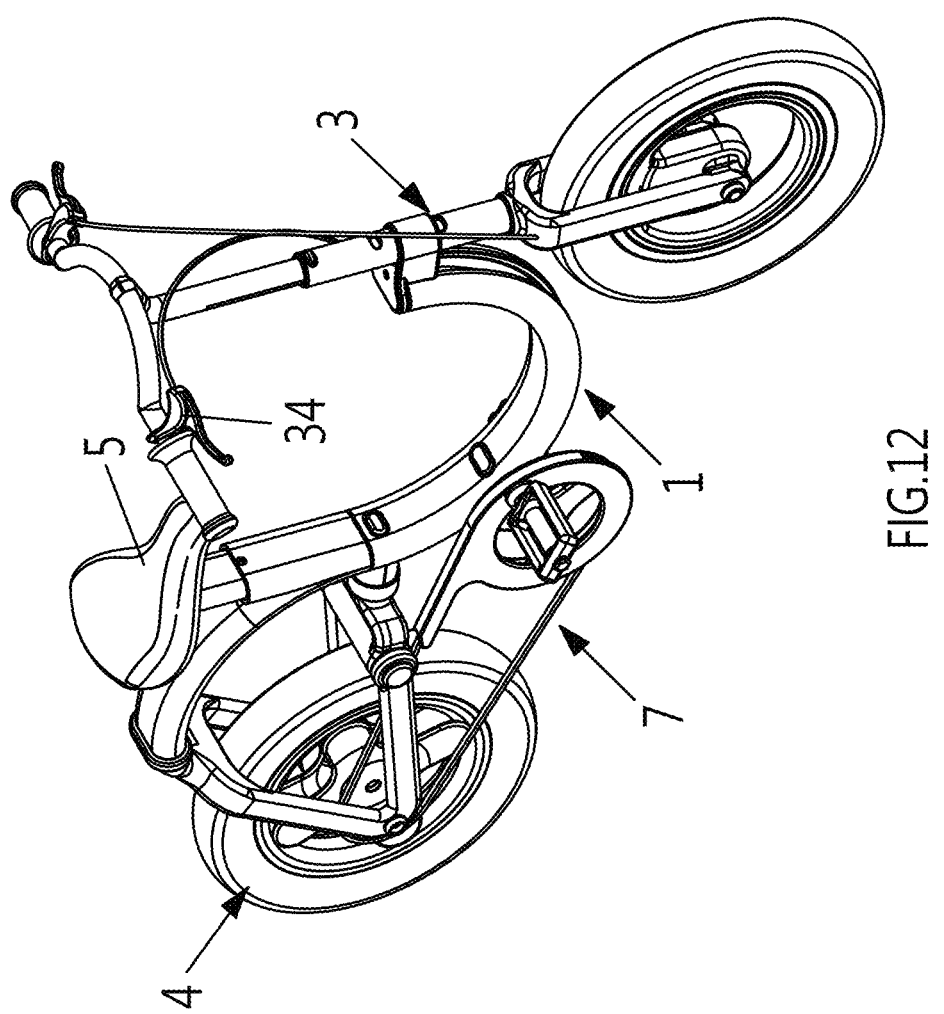
FIG.12 shows a perspective view of the third embodiment o according to the invention.

FIG. 11 and FIG. 12 show the third embodiment according to the invention, in which the cycle frame 1 is assembled with additional parts to form a child bicycle comprising the cycle frame 1, a first adapter 21, a second adapter 22 and a third adapter 23, a headset assembly 3, a rear fork assembly 4, a seat 5 and a pedal drive unit 7. Preferably, the balance cycle is assembled following the steps described below.

Step S301: a step for removably connecting the headset assembly 3 to the cycle frame 1. The first assembly 21 is releasably engaged the first opening 111 to position the headset assembly 3. Step S301 is substantially the same as step S101 described in the first embodiment, except that the headset assembly 3 of the third embodiment does not include a crank and pedals, but is equipped with a brake unit 34.

Step S302: a step for removably connecting the rear fork assembly 4 to the cycle frame 1. Step S302 is substantially the same as step S102 described in the first embodiment, except that the connecting unit of the second adapter 22 comprises, in addition to the first and the second connecting portions 251, 252, a third connecting portion 253 extending toward the upper rear, all being configured in the form of a socket. The second and the third connecting portions 252, 253 are adapted to releasably receive the protrusion 412 and the protrusion 413 of the rear fork assembly 4, respectively. The crank axle 71 of the pedal drive unit 7 is sleeved through a via hole 234 formed in the third adapter 23.

Step S303: a step for removably connecting the seat 5 to the cycle frame 1. The tube body 51 at the bottom of the seat 5 is removably connected to the first connecting portion 251 of the second adapter 22.

FIG. 12 shows the assembled child bicycle. It is suitable for a 4-6 year old child to ride on and move forward by pedaling the pedals 72 with feet to drive the pedal drive unit 7.

While the present invention has been described in detail herein, various modifications or changes within the spirit and scope of the present invention will be apparent to those skilled in the art. In view of the above disclosure, knowledge in the relevant art and the entire contents of documents discussed in the background and detailed description sections above are incorporated herein in their entirety for reference.

We claim:

1. A convertible child cycle, comprising:
   a cycle frame comprising an arc-shaped tubular body having a front end opening and a rear end opening and extending in a horizontal longitudinal direction and curved upwardly to define a hollow interior, wherein the arc-shaped tubular body is formed with a slot facing downward and extending from the front end opening to the rear end opening in the horizontal longitudinal direction, and the slot is substantially narrower in width than the hollow interior in a traverse direction substantially perpendicular to the horizontal longitudinal direction, and wherein the arc-shaped tubular body is further formed with a first installation connector disposed adjacent to the front end opening, a second installation connector disposed adjacent to the rear end opening, and a third installation connector disposed between the first and second installation connectors;
   a headset assembly removably connected to the arc-shaped tubular body by releasable engagement with the first installation connector, the front end opening and the hollow interior; and
   a rear fork assembly removably connected to the arc-shaped tubular body by releasable engagement with the second installation connector, the rear end opening and the hollow interior.

2. The convertible child cycle according to claim 1, wherein the arc-shaped tubular body comprises an elongated plate body that extends and curves upward along the horizontal longitudinal direction, and the elongated plate body comprises two opposite side walls that are bent downwardly along its full length and two retaining walls that are extended toward each other from the side walls, and wherein the retaining walls are spaced apart by a substantially constant distance, thereby defining the hollow interior and the slot.

3. The convertible child cycle according to claim 2, wherein the third installation connector is away from the second installation connector by a distance substantially shorter than that between the third installation connector and the first installation connector.

4. The convertible child cycle according to claim 3, wherein the third installation connector is located at a position approximately one-fourth the arc-shaped tubular body's full length from the rear end opening.

5. The convertible child cycle according to claim 3, wherein the first, the second, and the third installation connectors are configured as a first, a second, and a third openings disposed on the arc-shaped tubular body, and wherein the first, the second, and the third openings are arranged along the horizontal longitudinal direction and disposed opposite to the slot.

6. The convertible child cycle according to claim 3, wherein at least one of the first, the second, and the third installation connectors is configured to be a fastener secured to the arc-shaped tubular body.

7. The convertible child cycle according to claim 3, further comprising a first, a second and a third adapters for a releasable engagement with the first, the second, and the third installation connectors, respectively, wherein each of the first, the second and the third adapters comprises a coupling unit for releasable engagement with the hollow interior, a connecting unit, and a clasping unit for releasable engagement with one of the first, the second, and the third installation connectors.

8. The convertible child cycle according to claim 7, which is converted into a child tricycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting units of the second and the third adapters and pivotally provided with two rear wheels;
   the convertible child cycle further comprising:
      a seat releasably engaged the cycle frame adjacent to the third adapter; and
      a hand pusher unit removably connected to the cycle frame by releasable engagement with the connecting unit of the second adapter.

9. The convertible child cycle according to claim 7, which is converted into a balance cycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting units of the second and the third adapters and pivotally provided with a single rear wheel;
   the convertible child cycle further comprises:
      a seat removably connected to the cycle frame by releasable engagement with the connecting unit of the second adapter.

10. The convertible child cycle according to claim 7, which is converted into a child bicycle, wherein the headset assembly is removably connected to the cycle frame by releasable engagement with the connecting unit of the first adapter and pivotally provided with a front wheel, and wherein the rear fork assembly is removably connected to the cycle frame by releasable engagement with the connecting unit of the second adapter and pivotally provided with a single rear wheel;
   the convertible child cycle further comprising:
      a seat removably connected to the cycle frame by releasable engagement with the connecting unit of the second adapter; and
      a pedal drive unit removably connected to the cycle frame by releasable engagement with the connecting unit of the third adapter.

* * * * *